(12) United States Patent
Semin et al.

(10) Patent No.: US 9,104,490 B2
(45) Date of Patent: Aug. 11, 2015

(54) METHODS, SYSTEMS AND APPARATUSES FOR PROCESSOR SELECTION IN MULTI-PROCESSOR SYSTEMS

(71) Applicant: Intel Corporation, Santa Clara, CA (US)

(72) Inventors: Andrey Semin, Feldkirchen/Munich (DE); Alexander Tank Supalov, Tuntenhausen (DE)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 13/728,367

(22) Filed: Dec. 27, 2012

(65) Prior Publication Data

US 2014/0189701 A1    Jul. 3, 2014

(51) Int. Cl.
G06F 9/48 (2006.01)
G06F 9/50 (2006.01)

(52) U.S. Cl.
CPC .............. *G06F 9/505* (2013.01); *G06F 9/4812* (2013.01)

(58) Field of Classification Search
None
See application file for complete search history.

(56) References Cited

U.S. PATENT DOCUMENTS

| | | | |
|---|---|---|---|
| 2006/0031691 A1* | 2/2006 | Bacchus et al. | 713/300 |
| 2006/0079979 A1* | 4/2006 | Giebels et al. | 700/96 |
| 2010/0023666 A1* | 1/2010 | Mansell et al. | 710/267 |
| 2011/0252192 A1* | 10/2011 | Busch et al. | 711/105 |
| 2012/0319965 A1* | 12/2012 | Kurabayashi et al. | 345/173 |
| 2013/0103872 A1* | 4/2013 | Ho et al. | 710/269 |

* cited by examiner

*Primary Examiner* — Emerson Puente
*Assistant Examiner* — Jonathan R Labud
(74) *Attorney, Agent, or Firm* — Hanley, Flight & Zimmerman, LLC

(57) ABSTRACT

Methods, systems and apparatuses for processor selection in multi-processor systems are disclosed. An example method includes, for each of a plurality of processors, retrieving a list of interrupt instances for a plurality of interrupt types; calculating an interrupt instance count value for each of the plurality of interrupt types; multiplying a corresponding weighting factor by the interrupt instance count value for each one of the plurality of interrupt types to generate a plurality of weighted interrupt values; calculating an overall weighted vector value based on the sum of the plurality of weighted interrupt values; and designating one of the plurality of processors as a selected processor based on the lowest overall weighted vector value.

15 Claims, 8 Drawing Sheets

400

402　　404　　406

|  | 4865302 | * | 1 | = | 4865302 |  |
|---|---|---|---|---|---|---|
| + | 132 | * | 2 | = | 264 | ← 408 |
| + | 87298 | * | 1 | = | 87298 |  |
| + | 93707 | * | 1 | = | 93707 |  |
| + | 19883500 | * | 1 | = | 19883500 |  |
| + | 462850 | * | 1 | = | 462850 |  |
| + | 2472 | * | 3 | = | 7416 | ← 408 |
| + | 462654 | * | 1 | = | 462654 |  |
| + | 3046 | * | 1 | = | 3046 |  |
|  |  |  |  |  | 25866037 | — 412 |

FIG. 4

METHODS, SYSTEMS AND APPARATUSES FOR PROCESSOR SELECTION IN MULTI-PROCESSOR SYSTEMS

FIELD OF THE DISCLOSURE

The present disclosure relates generally to computing platforms and, more particularly, to methods, systems and apparatuses for processor selection in multi-processor systems.

BACKGROUND

Some computing platforms have multiple cores and/or processors than can each execute operations in parallel. Machine level execution of applications on such computing platforms can be improved by assigning different execution threads to different cores/processors to better utilize resources of the computing platform and reduce competition between execution threads for the resources of computing platform.

BRIEF DESCRIPTION OF THE DRAWINGS

FIG. 4 is an illustration of an example calculation of a weighted interrupt count sum.

DETAILED DESCRIPTION

Figure 1:
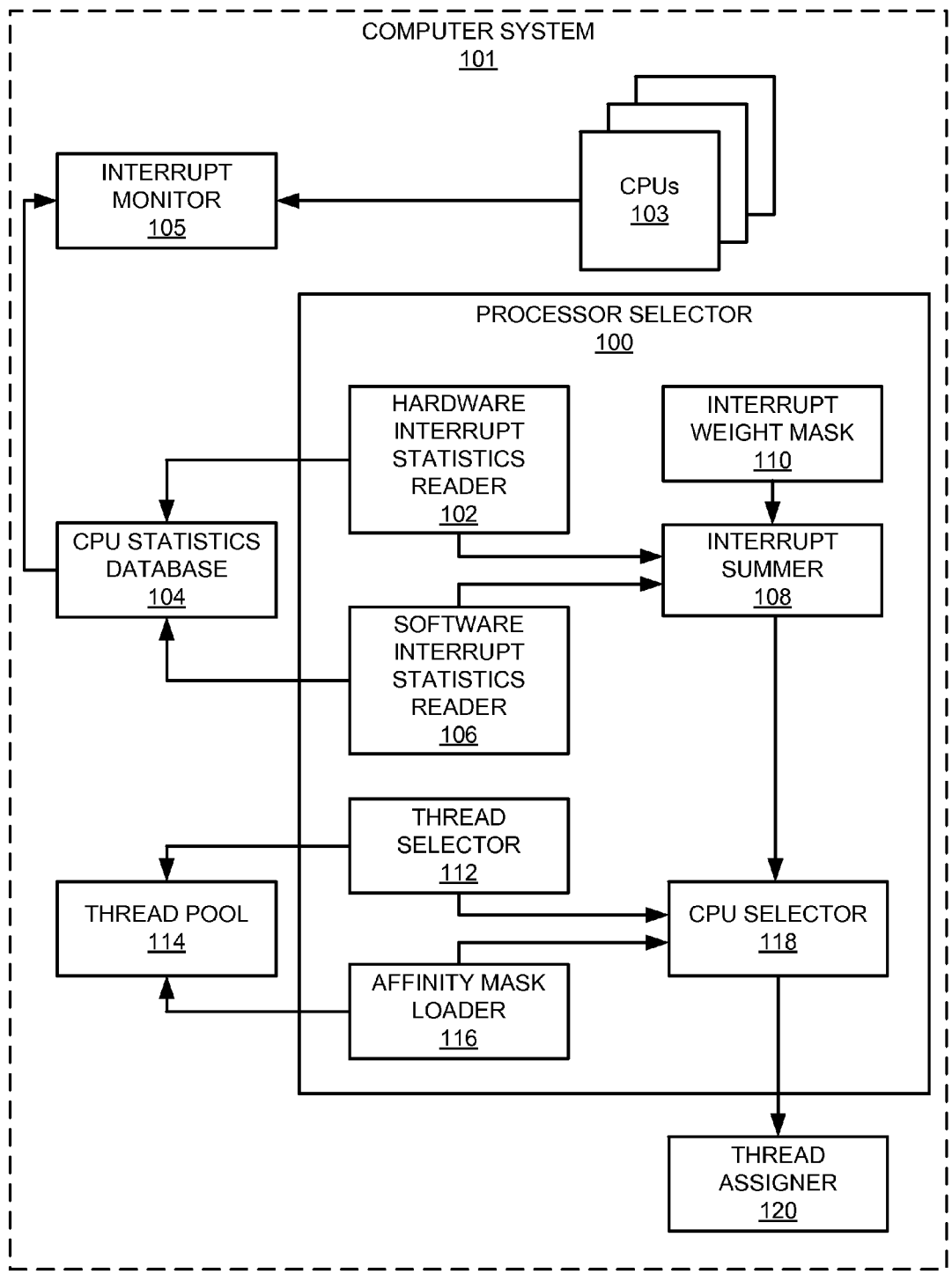
FIG. 1 is a schematic illustration of a processor selector for a multi-CPU system constructed in accordance with the teachings of this disclosure to select processors in multi-processor systems.

Example computing platforms contain a central processing unit (CPU), such as a microprocessor, which communicates with a memory of the computing platform and executes instructions specified by software to perform one or more computing tasks. Some example computing platforms use multiple processors in the same computer system. These multiple processors may each communicate with the memory and execute instructions independently from one or more other processors in the computer system. Some example processors may contain multiple cores, in which each core may operate as a separate CPU contained on a single physical processor package and execute instructions independently from the other cores of in the processor package. Still other example computing platforms support hyper-threading technology. Processors that utilize hyper-threading may allow each core of the processor to be addressed as two or more logical CPUs that can each independently execute instructions. A computing system may use any combination of multiple processors, multiple cores and/or hyper-threading to increase the total number of CPUs available to the example computing system.

The above example computer architectures allow a single computing system to utilize multiple CPUs operating in parallel. Parallel computing can greatly increase the performance of the computing system by executing multiple instructions on different CPUs in an independent manner. However, to take advantage of parallel processing capabilities, the computing system must be able to effectively manage and coordinate the operation of the multiple available CPUs (e.g., multiple cores).

Computer systems may attempt to execute multiple software applications or processes at generally the same time. Some processes attempt to execute multiple threads, wherein each thread may be a sequence of instructions to be executed by a CPU. In a computer system that has a single CPU with a single core, only one thread at a time can be executed by the CPU. Such single CPU can use time-domain multiplexing, in which the CPU switches between the execution of different threads to seemingly execute multiple threads simultaneously. However, because only one thread is actually executing at any given time, executing multiple threads on such a single CPU using time-domain multiplexing may not be any faster than executing the multiple threads sequentially on the single CPU. However, in a computer system that has multiple CPUs and/or cores, multiple threads can be assigned to different CPUs and/or cores to execute independently of and/or in parallel with each other, which may increase the speed of the execution of the multiple threads and enhance the performance of the computer system.

To increase (e.g., maximize) the performance gains of example computer systems with multiple CPUs, the threads to be executed by the computer systems are assigned to the one or more CPUs of the computer system in a managed manner. If too many threads are assigned to one CPU and the load on that CPU is significantly greater than the load on one or more other CPUs, overall system performance may be worse than it would be if the loads on the one or more CPUs were more evenly distributed.

Example methods, systems, apparatus, and/or articles of manufacture disclosed herein provide managed mechanisms for assigning threads to one or more CPUs in a multi-CPU and/or multi-core computer system. In particular, examples disclosed herein assign threads based on the interrupt history of each CPU in the system. As used herein, an interrupt is a signal sent to a CPU indicating that an event on the computer system needs attention (e.g., immediate attention) from the CPU. Upon receiving an interrupt, the example CPU halts the thread it is executing, saves a current state of the halted thread and executes an interrupt handler to deal with the event. After the interrupt handler completes its execution, the example CPU loads the previously saved state and continues execution of the previously halted thread.

Because an interrupt causes the example CPU to temporarily halt the execution of a thread, the more interrupts that the CPU handles, the longer it takes that CPU to execute one or more process threads. By looking at the number of interrupts that the example CPU has handled in the past, a computer system can calculate an estimate of how many resources (e.g., time, clock cycles, etc.) the CPU typically consumes handling interrupts. The more time the example CPU spends handling interrupts, the less time the CPU has to spend executing process threads. Conversely, the less time that the example CPU spends handling interrupts, the more time the CPU has to spend executing threads.

As described in greater detail below, examples disclosed herein retrieve statistics from a computer system listing the number of interrupts handled by each CPU since the last system boot. Examples disclosed herein also compute a weighted interrupt count sum vector by multiplying the number of each type of interrupt handled by a weight (e.g., predefined weight value) and sum the results for each CPU. Still other examples disclosed herein assign a thread to the CPU with the lowest weighted interrupts count sum and additional threads are assigned to the CPU with the next lowest weighted interrupt count sum and so on until all threads have been assigned to a CPU. As a result of using interrupt history to assign threads to CPUs in a multi-CPU system, threads are assigned to the CPU that can best handle the threads so as to improve (e.g., increase, maximize, etc.) system performance.

FIG. 1 is a block diagram of an example processor selector 100 constructed in accordance with the teachings of this disclosure. The example processor selector 100 of FIG. 1 is described below in connection with a computer system 101 that has multiple CPUs 103. In the illustrated example of FIG. 1, the example processor selector 100 is integrated with the example computer system 101. Alternatively, the processor selector 100 may be communicatively connected to the computer system 101 to facilitate processor selection.

The example multiple CPUs 103 of the example computer system 101 of FIG. 1 include one or more physical processors, with each processor having one or more cores. The example computer system 101 of FIG. 1 may or may not support hyper-threading. For a computer system that does not support hyper-threading, each core of each processor on the system is considered one CPU. For a computer system that supports hyper-threading, each core of each processor on the system is considered two or more CPUs because hyper-threading allows the computer system 101 to independently address two or more logical CPUs for each physical core present in the system.

The example processor selector 100 of FIG. 1 includes a hardware interrupt statistics reader 102 to retrieve hardware interrupt statistics. An example hardware interrupt is an interrupt sent to a CPU 101 by a hardware device, such as, for example a hard drive or a keyboard. In the illustrated example of FIG. 1, an interrupt monitor 105 monitors the hardware interrupts handled by each of the CPUs 103.

Some computer systems record statistics for the number of hardware interrupts handled by each CPU of the system since the last time the system was booted. For example, in computer systems using the Linux operating system, these hardware interrupt statistics are stored in the file '/proc/interrupts.' In some computer systems with other operating systems, hardware interrupt statistics can be accessed via other methods. In the illustrated example of FIG. 1, hardware interrupt statistics are compiled and stored in a CPU statistics database 104.

The example CPU statistics database 104 communicates with the example interrupt monitor 105 to acquire information about hardware interrupts handled by the example CPUs 103. Every time that a hardware interrupt is handled by an example CPU 103, the example interrupt monitor 105 detects that the interrupt was handled and sends information to the example CPU statistics database 104 including the type of interrupt handled and which CPU 103 handled the interrupt. As the example CPU statistics database 104 receives information from the example interrupt monitor 105 about all of the hardware interrupt instances handled by each of the example CPUs 103, the CPU statistics database 104 compiles and stores statistics including the number of hardware interrupts that each CPU 103 of the example computer system 101 has handled since the last system boot. The example CPU statistics database 104 also compiles and stores statistics about the types of hardware interrupts handled. In other words, for each example CPU 103 on the example computer system 101, the example CPU statistics database 104 compiles and stores the interrupt instance count of each type of hardware interrupt handled since the last system boot.

Figure 2:
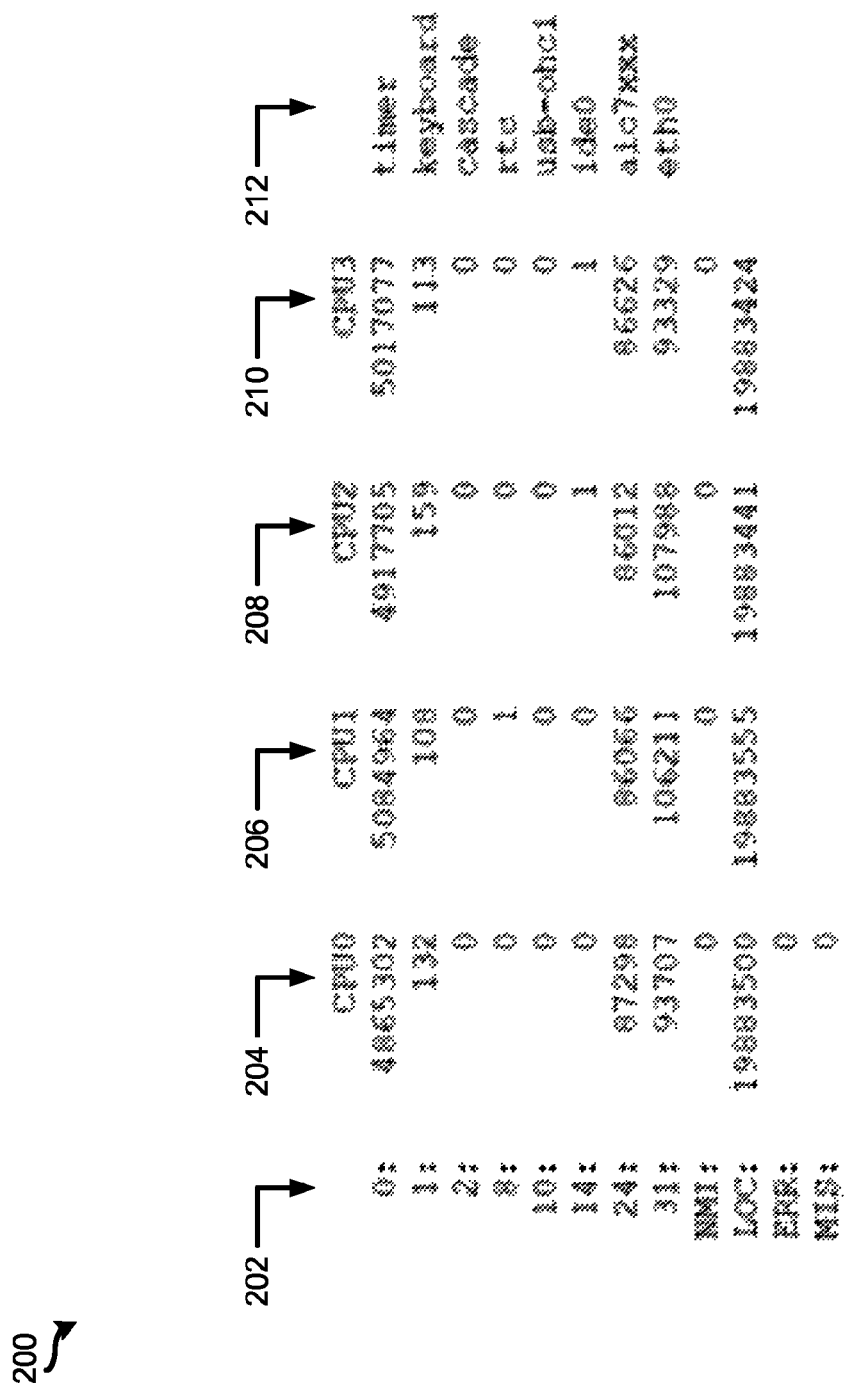
FIG. 2 is an illustration of example hardware interrupt statistics.

FIG. 2 illustrates example hardware interrupt statistics 200 contained in the example CPU statistics database 104 of FIG. 1. As described above, the example statistics 200 of FIG. 2 may be retrieved from an example 'proc/interrupts' file of a Linux-based computer system. However, hardware interrupt statistics may be retrieved from any type of computer system, without limitation. In the illustrated example of FIG. 2, the statistics 200 correspond to four CPUs, denoted as CPU0, CPU1, CPU2 and CPU3. Column 202 of FIG. 2 lists interrupt request (IRQ) numbers of the computer system, in which each device in the example computer system is assigned its own IRQ number to identify which device is sending the example CPU an interrupt. Column 212 of FIG. 2 lists the names of example devices that correspond to the example IRQ numbers in column 202. Columns 204, 206, 208 and 210 list a number of hardware interrupts associated with each device type handled by CPU, CPU1, CPU2 and CPU3, respectively, since the last system boot. For example, the keyboard using IRQ 1 has sent 132 interrupts to CPU0, 108 interrupts to CPU1, 159 interrupts to CPU2 and 113 interrupts to CPU3 since the last system boot.

Returning to the illustrated example of FIG. 1, the example processor selector 100 includes a software interrupt statistics reader 106 to retrieve software interrupt statistics. As used herein, a software interrupt is similar to a hardware interrupt, but triggered by the software itself. For example, the handling of a hardware interrupt may acknowledge the interrupt and then raise a software interrupt to actually process the data associated with the interrupt. In the illustrated example of FIG. 1, the interrupt monitor 105 monitors the software interrupts handled by each of the CPUs 103.

Some computer systems record statistics for the number of software interrupts handled by each CPU of the system since the last time the system was booted. For example, in computer systems using the Linux operating system, these software interrupt (softirq) statistics are stored in the file '/proc/softirqs.' In some computer systems with other operating systems, software interrupt statistics can be accessed via other methods. In the illustrated example of FIG. 1, software interrupt statistics are compiled and stored in the CPU statistics database 104.

The example CPU statistics database 104 of FIG. 1 communicates with the example interrupt monitor 105 to acquire information about software interrupts handled by the example CPUs 103. Every time that a software interrupt is handled by an example CPU 103, the example interrupt monitor 105 of the illustrated example detects that the interrupt was handled and sends information to the example CPU statistics database 104 including the type of interrupt handled and which CPU 103 handled the interrupt. As the example CPU statistics database 104 receives information from the example interrupt monitor 105 about all of the software interrupt instances handled by each of the example CPUs 103, the CPU statistics database 104 of the illustrated example compiles and stores statistics including the number of software interrupts that each CPU 103 of the example computer system 101 has handled since the last system boot. The example CPU statistics database 104 of FIG. 1 also compiles and stores statistics about the types of software interrupts handled. In other words, for each example CPU 103 of the example computer system 101, the example CPU statistics database 104 compiles and stores the interrupt instance count of each type of software interrupt handled since the last system boot.

Figure 3:
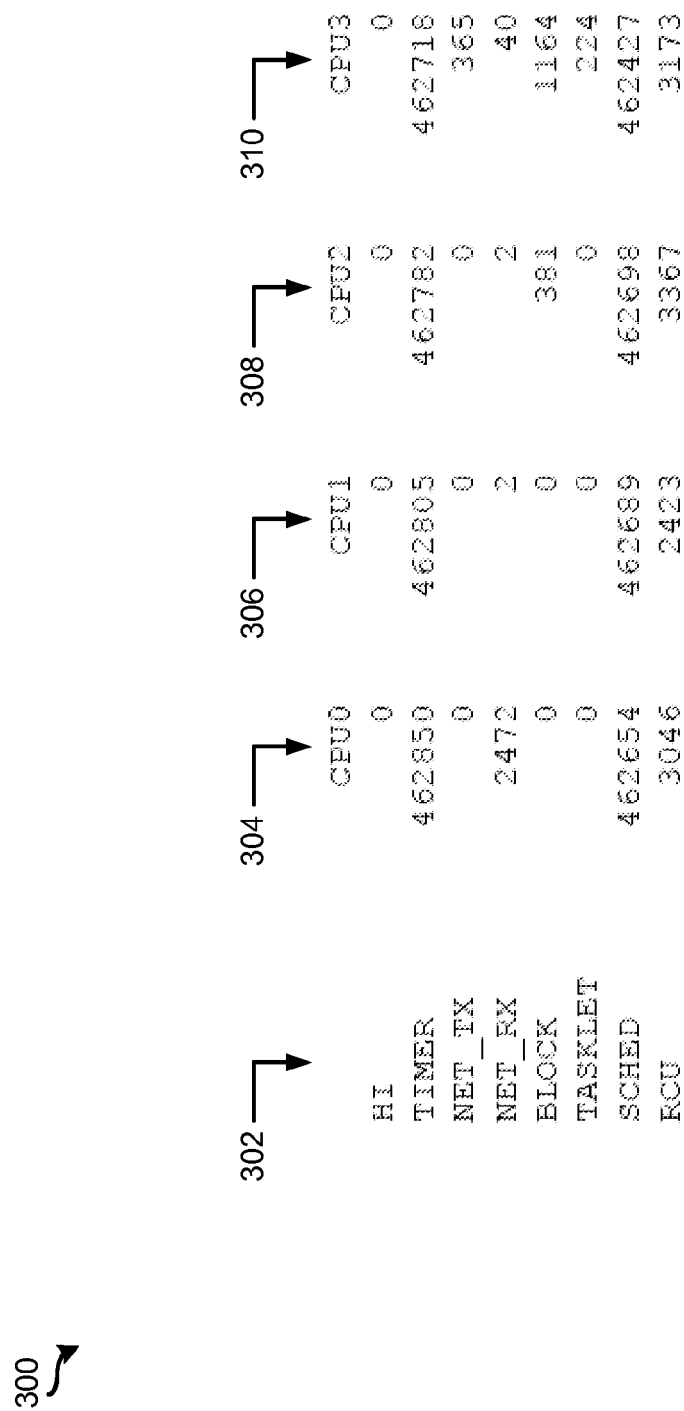
FIG. 3 is an illustration of example software interrupt statistics.

FIG. 3 illustrates example software interrupt statistics 300 contained in the example CPU statistics database 104 of FIG.

1. The example statistics 300 of FIG. 3 may be retrieved from an example 'proc/softirqs' file of a Linux-based computer system. However, software interrupt statistics may be retrieved from any type of computer system, without limitation. In the illustrated example of FIG. 3, the statistics 300 correspond to four CPUs, denoted as CPU0, CPU1, CPU2 and CPU3. Column 302 of FIG. 3 lists different types of software interrupts. Columns 304, 306, 308 and 310 list the number of software interrupts of each type handled by CPU, CPU1, CPU2 and CPU3 respectively since the last system boot. For example, for an interrupt called NET_RX, a software interrupt that handles received network data packets, 2472 interrupts were processed on CPU0, 2 interrupts were processed on CPU1, 2 interrupts were processed on CPU2 and 40 interrupts were processed on CPU3.

Returning to the illustrated example of FIG. 1, the example processor selector 100 includes an interrupt summer 108. After the example hardware interrupt statistics reader 102 and the example software interrupt statistics reader 106 retrieve the respective hardware interrupt statistics and software interrupt statistics from the example CPU statistics database 104, the interrupt statistics are sent to the example interrupt summer 108. The example interrupt summer 108 of FIG. 1 computes a weighted interrupt count sums (WICS) vector. In the illustrated example, each element of the example WICS vector is a weighted sum of the number of interrupts handled by one of the example CPU 103 of the example computer system 101. The example WICS vector of the illustrated example has a number of elements equal to the number of example CPUs 103 in the example computer system 101.

As used herein, a vector represents a weighted interrupt count sum for each example CPU 103 of the example computer system 101. Each interrupt type may be weighted by, for example, multiplying the number of interrupts of a type by a factor before the number is added to the sum. Each element of the example WICS vector corresponds to an example CPU 103 of the example computer system 101. For example, if the computer system 101 has sixteen (16) CPUs 103, then the example WICS vector will have sixteen (16) elements.

Every time an interrupt request is received by an example CPU 103, the thread being executed by the CPU 103 is interrupted until the interrupt is handled. However, because some interrupts take longer to handle than other interrupts, in the illustrated example the sum is weighted based on an absolute and/or relative difference in time and/or resource consumption (e.g., clock cycles) required to handle each type of interrupt. Accordingly, to estimate how much time and/or other resource metric (e.g., clock cycles) each example CPU 103 consumes handling interrupts, the interrupt statistics of the illustrated example are weighted according to the approximate consumption value (e.g., seconds, clock cycles, etc.) for each type of interrupt to be handled.

The example processor selector 100 of FIG. 1 includes an interrupt weight mask 110. The example interrupt weight mask 110 of FIG. 1 contains a relative weight for each type of hardware interrupt (e.g., hardware interrupts from each device on the system) and each type of software interrupt handled by the example computer system 101. In some examples, the weights in the interrupt weight mask 110 are based on the relative time it takes to handle each type of interrupt. For instance, in the illustrated example of FIG. 2, if it is determined that interrupts from the keyboard take twice as long to handle as other interrupts, and every other interrupt type takes approximately the same amount of time to handle, then the weight mask 110 may establish a value of 2 for interrupts from the keyboard on IRQ 0 and a value of 1 for every other interrupt type. The example weight mask 110 may also contain values for each type of software interrupt where weights are determined based on the relative time it takes to handle each type of software interrupt. For example, if software interrupts from NET_RX take approximately 3 times as long as each of the other software interrupts, then the example weight mask 110 may establish a value of 3 for NET_RX software interrupts and a value of 1 other interrupt types.

In some examples, the weights in the interrupt weight mask 110 are determined and/or otherwise calculated prior to thread execution and cannot be changed during run-time. In other examples, the weights in the interrupt weight mask 110 are assigned and/or otherwise calculated at run-time and/or based on conditions experienced by the example computer system 101. Assigning the weights to the interrupt weight mask 110 at run-time allows adjustment of the weights based on more recent data about how long each type of interrupt takes (e.g., or a number of clock cycles consumed) to handle than is possible using a predetermined interrupt weight mask 110.

After loading the hardware and software interrupt statistics for each example CPU 103 from the example hardware interrupt statistics reader 102 and the example software interrupt statistics reader 106 respectively, the example interrupt summer 108 of FIG. 1 computes the elements of the WICS vector. In the illustrated example of FIG. 1, the value of the first element of the WICS vector is computed by multiplying the number of each type of interrupt handled by the first CPU 103 by the corresponding weight from the interrupt weight mask 110 and summing these values. The values of the other elements of the WICS vector are calculated in a similar manner using interrupt statistics from the other example CPUs of the example computer system 101.

FIG. 4 illustrates an example calculation 400 of the value of an element of an example WICS vector corresponding to CPU0 of the example of FIGS. 2 and 3 using the example hardware interrupt statistics of FIG. 2 and the example software interrupt statistics of FIG. 3. In the illustrated example of FIG. 4, the interrupt weight mask 110 uses a value of 2 for hardware interrupts from the keyboard (row 408), a value of 3 for NET_RX (row 410), and a value of 1 for all other interrupt types. The calculation 400 in the illustrated example of FIG. 4 multiplies the number of interrupts of each type in column 402 by a weight in column 404 to calculate a weighted interrupt count in column 406. All of the calculated weighted interrupt counts in column 406 of FIG. 4 are then added together to calculate a weighted interrupt count sum 412. As such, in the example of FIG. 4, the calculated weighted interrupt count sum of 25,866,037 would be used as the value of the element of the WICS vector corresponding to CPU0. The values of the other elements of the WICS vector corresponding to CPU1, CPU2 and CPU3 of the example of FIGS. 2 and 3 are calculated in a similar manner using the same interrupt weight mask 110 and the respective interrupt counts from CPU1, CPU2 and CPU3.

Because the example computer system in the illustrated examples of FIGS. 2 and 3 has four CPUs, the WICS vector associated with the example computer system of FIGS. 2 and 3 will have four elements, wherein each element is the weighted sum of interrupts handled by a corresponding CPU. The example processor selector 100 of FIG. 1 will calculate a WICS vector having a corresponding different number of elements for other computer systems having a different number of CPUs.

Figure 5:
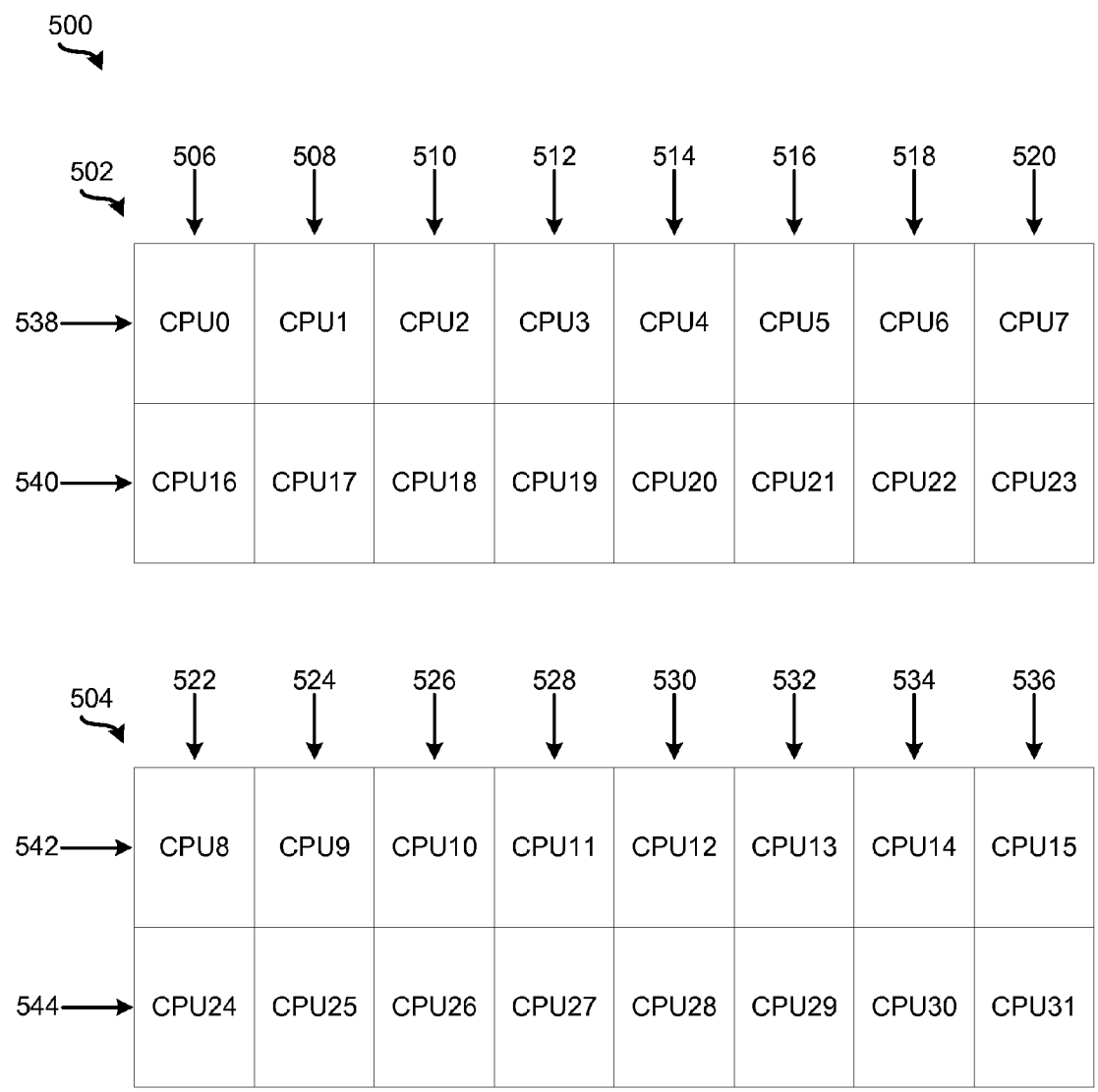
FIG. 5 is a schematic illustration of an example computer system with multiple CPUs.

FIG. 5 illustrates a graphical representation of an example computer system 500 with an Intel® Xeon® E5-2670 microprocessor. In the illustrated example of FIG. 5, the computer system 500 has two (2) physical processors 502 and 504.

Each of the two example physical processors 502 and 504 has eight (8) cores. The example processor 502 has cores 506, 508, 510, 512, 514, 516, 518 and 520. The example processor 504 has cores 522, 524, 526, 528, 530, 532, 534 and 536. The example computer system 500 utilizes hyper-threading, which allows each core of the computer system 500 to be addressed as two logical CPUs. This hyper-threading capability is illustrated in FIG. 5, wherein rows 538 and 540 represent the two logical CPUs of each core of the example processor 502 and rows 542 and 544 represent the two logical CPUs of each core of the example processor 504. Altogether, the example computer system 500 of FIG. 5 has thirty-two (32) CPUs labeled as CPU0 through CPU31.

Figure 6:
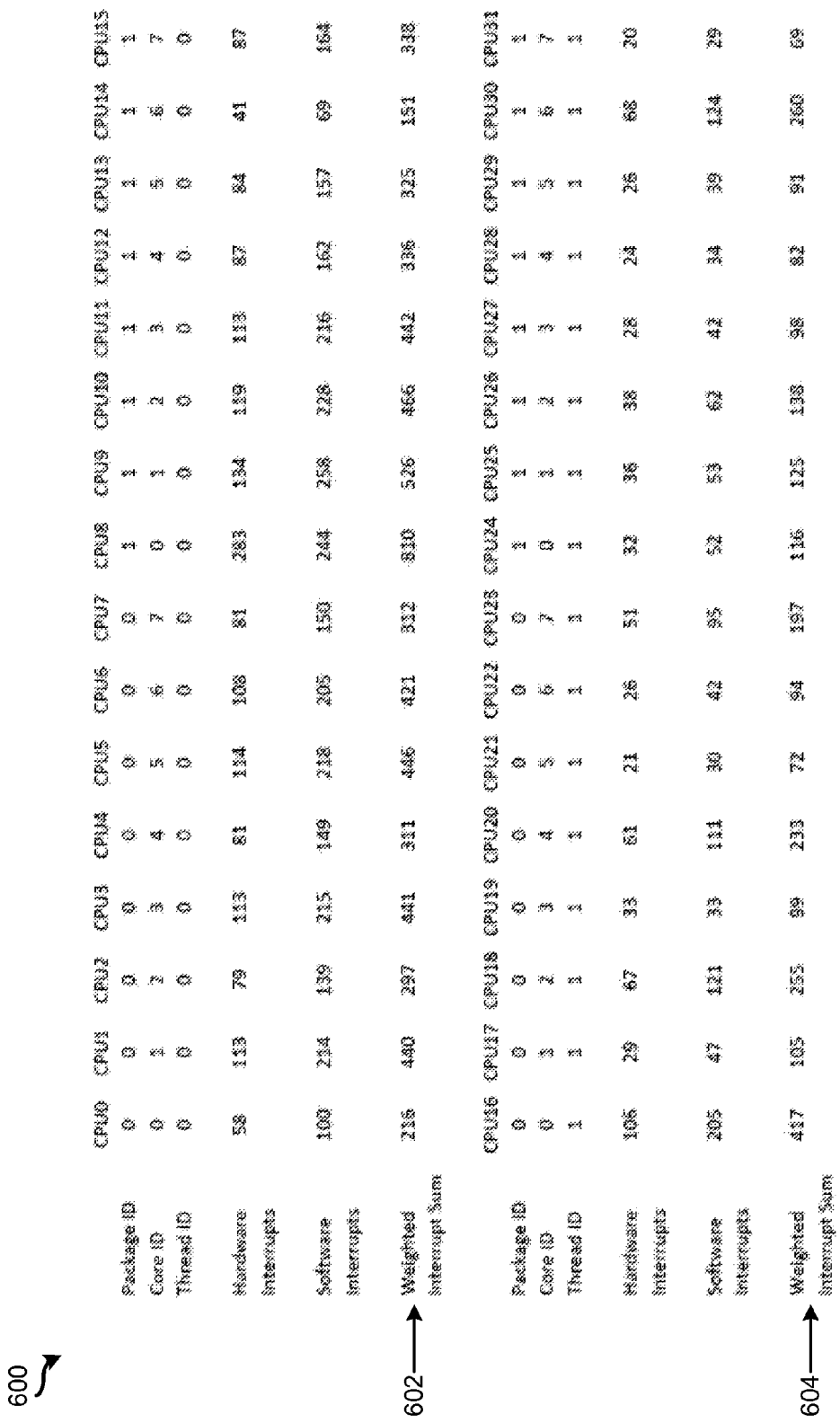
FIG. 6 is an illustration of an example interrupt statistics table.

FIG. 6 illustrates an example table 600 listing the number of interrupts handled by the example computer system 500 of FIG. 5. As explained above, the example computer system 500 of FIG. 5 has thirty-two (32) CPUs. Accordingly, the example table 600 of FIG. 6 has thirty-two (32) columns, wherein each column represents data from one of the CPUs of the example computer system 500 of FIG. 5. The thirty-two (32) CPUs are identified in the example table 600 of FIG. 6 by a Package ID, a Core ID and a Thread ID. The Package ID of the example table 600 of FIG. 6 is either 0 or 1, wherein Package ID 0 corresponds to the example processor 502 of FIG. 5 and Package ID 1 corresponds to the example processor 504 of FIG. 5. The Core ID of the example table 600 of FIG. 6 is between 0 and 7, wherein the Core ID corresponds to one of the eight (8) cores of the example processors 502, 504 of FIG. 5. The Thread ID of the example table 600 of FIG. 6 is either 0 or 1, which corresponds to one of the two logical CPUs of the cores of the example computer system 500 of FIG. 5.

The example table 600 of FIG. 6 lists the number of hardware interrupts and the number of software interrupts handled by each of the thirty-two (32) CPUs since the last boot of the example computer system 500 of FIG. 5. Rows 602, 604 of the example table 600 of FIG. 6 list the weighted interrupt count sum for each of the thirty-two (32) CPUs where the interrupt weight mask was set to 2 for all hardware interrupts and 1 for all software interrupts. Accordingly, the weighted interrupt count sum for each CPU was calculated by multiplying the number of hardware interrupts by 2 and adding the result to the number of software interrupts. In the event a different interrupt weight mask 110 is used, the values of the weighted interrupt count sums of rows 602, 604 would change. In the example of FIG. 6 the number of interrupts and the values of the weighted interrupt count sums are listed in millions and rounded to the nearest million. For example, CPU0 has handled about 58 million hardware interrupts, about 100 million software interrupts and has a weighted interrupt count sum of about 217 million in the example of FIG. 6. An example WICS vector can be constructed from the example table 600 of FIG. 6, wherein the WICS vector has thirty-two (32) elements corresponding to the thirty-two (32) CPUs listed in the table 600. The values of the elements of the example WICS vector are the values of the weighted interrupt count sums of each CPU listed in rows 602, 604 of the example table 600. For example, the value of the first element of the example WICS vector corresponding to CPU0 is 216 million and the value of the last element of the WICS vector corresponding to CPU31 are 69 million in the example of FIG. 6.

Returning to FIG. 1, in response to the example interrupt summer 108 computing the value of every element of the example WICS vector, the WICS vector is sent to an example CPU selector 118. In the illustrated example of FIG. 1, the CPU selector 118 selects a CPU to which a new thread is assigned. In addition to the example interrupt summer 108, the example CPU selector 118 of the illustrated example also receives input from an example thread selector 112 and an example affinity mask loader 116. The example thread selector 112 of the illustrated example selects a thread to be assigned from an example thread pool 114, which contains one or more threads to be assigned to one or more example CPUs 103 for execution. Whenever a new application or process is started on the example computer system 101 of FIG. 1, one or more threads are created and the threads are placed in the example thread pool 114 to be assigned to and executed by an example CPU 103. Some threads have an associated affinity mask, which specifies that the thread can only be assigned to a subset of the CPUs 103 of the example computer system 101. For example, an application executing a thread may create an affinity mask specifying that the thread is to be assigned to a particular CPU. In other examples, an affinity mask may be created for a thread specifying that the thread is to be assigned to any one of several CPUs, such as any core on a specific physical processor (e.g., the processor that is closest to needed execution resources, such as a disk drive). In the example processor selector 100 of FIG. 1, any affinity mask associated with a particular thread is retrieved by an affinity mask loader 116.

The example CPU selector 118 of FIG. 1 receives input from the example interrupt summer 108, the example thread selector 112 and the example affinity mask loader 116. The example interrupt summer 108 of the illustrated example sends the computed WICS vector (e.g., the vector comprised of elements whose values are taken from rows 602, 604 of the example table 600 of FIG. 6) to the example CPU selector 118. In the example of FIG. 1, the example thread selector 112 selects a thread from the example thread pool 114, and the example affinity mask loader 116 retrieves the affinity mask associated with the selected thread if there is such an affinity mask for the thread. The example CPU selector 118 then considers every CPU among the subset of CPUs 103 allowable by the affinity mask (if no associated affinity mask exists for the selected thread, the CPU selector 118 considers every CPU 103) and selects the CPU 103 with the lowest corresponding weighted interrupt count sum value. For example, if the WICS vector taken from example table 600 of FIG. 6 was used to assign a thread with no affinity mask, CPU 31 with Package ID 1, Core ID 7 and thread ID 1 are chosen by the CPU selector 118 of the illustrated example because the weighted interrupt count sum for CPU 31 is 69 million, which is less than the weighted interrupt count sum for any other CPU. Alternatively, if the WICS vector taken from example table 600 of FIG. 6 was used to assign a thread with an affinity mask requiring the thread to be assigned to the processor with Package ID 0, then the CPU selector 118 of the illustrated example selects CPU 21 with Package ID 0, Core ID 5 and Thread ID 1 because the weighted interrupt count sum of CPU 21 is 72 million, which is less than the weighted interrupt count sum of any other CPU with Package ID 0. Once a CPU has been selected for a thread by the example CPU selector 118 in the illustrated example, a thread assigner 120 actually assigns the thread to the appropriate CPU.

After the example CPU selector 118 selects a CPU 103 to which a thread is assigned, if there are additional threads in the example thread pool 114 then the example thread selector 112 loads another thread from the example thread pool 114 and the example affinity mask loader 116 loads a corresponding affinity mask associated with that thread if there is one. The example CPU selector 118 then assigns the thread to a different CPU 103 than was assigned to the previous thread. Because a CPU can only execute one thread at a time, once a thread is assigned to a CPU by the example CPU selector 118, one or more additional threads from the example thread pool 114 are assigned to other CPUs. Accordingly, when assigning threads to a CPU, the example CPU selector 118 of FIG. 1 selects the CPU from all CPUs 103 allowed by the affinity mask with (a) the lowest corresponding WICS value that (b) has not been previously assigned by the example CPU selector 118. For example, if the CPU selector 118 using the WICS vector taken from example table 600 of FIG. 6 assigned the first thread from the thread pool 114 to CPU 31 and the second thread to be assigned had an affinity mask that required the thread to be assigned to the processor with Package ID 1, then the CPU selector 118 of the illustrated example selects CPU 28 with Package ID 1, Core ID 4 and Thread ID 1. This selection is made because the weighted interrupt count sum of CPU 28 is 82 million, which is less than the weighted interrupt count sum of every other CPU with Package ID 1 other than CPU 31, to which the previous thread was assigned.

In some examples, the interrupt summer 108 uses other methods to weight the information received from the hardware interrupt statistics reader 102 and the software interrupt statistics reader 106. In some other examples, the CPU selector 118 receives information from the computer system 101 in addition to the information received from the interrupt summer 108. For example, the CPU selector 118 may receive information about actual memory utilization on NUMA nodes, core C-states residency statistics, thermal statistics and/or any other information about the one or more CPUs 103 of the computer system 101. Any such additional information received from the computer system 101 is considered by the example CPU selector 118 along with the information received from the example interrupt summer 108 in determining which CPU(s) 103 to assign a thread from the example thread pool 114. Information received from the interrupt summer 108 may be weighted by the example CPU selector 118 based on the information received about memory utilization on NUMA nodes, core C-states residency statistics, thermal statics and/or any other information received by the CPU selector about the CPUs 103 of the computer system 101. After the example CPU selector 118 weights all the information it receives, the CPU selector 118 selects a CPU to assign a thread based on the received information.

While an example manner of implementing the processor selector 100 has been illustrated in FIG. 1 to select processors in multi-processor systems, one or more of the elements, processes and/or devices illustrated in FIG. 1 may be combined, divided, re-arranged, omitted, eliminated and/or implemented in any other way. Further, any or all of the example hardware interrupt statistics reader 102, the example CPU statistics database 104, the example interrupt monitor 105 the example software interrupt statistics reader 106, the example interrupt summer 108, the example interrupt weight mask 110, the example thread selector 112, the example thread pool 114, the example affinity mask loader 116, the example CPU selector 118, the example thread assigner 120, and/or, more generally, the example processor selector 100 of FIG. 1 may be implemented by hardware, software, firmware and/or any combination of hardware, software and/or firmware. Thus, for example, any of the example hardware interrupt statistics reader 102, the example CPU statistics database 104, the example interrupt monitor 105, example software interrupt statistics reader 106, the example interrupt summer 108, the example interrupt weight mask 110, the example thread selector 112, the example thread pool 114, the example affinity mask loader 116, the example CPU selector 118, the example thread assigner 120, and/or, more generally, the example processor selector 100 of FIG. 1 could be implemented by one or more circuit(s), programmable processor(s), application specific integrated circuit(s) (ASIC(s)), programmable logic device(s) (PLD(s)), microprocessor(s), hardware processor(s), and/or field programmable logic device(s) (FPLD(s)), etc. When any of the system or apparatus claims of this patent are read to cover a purely software and/or firmware implementation, at least one of the example hardware interrupt statistics reader 102, the example CPU statistics database 104, the example interrupt monitor 105, the example software interrupt statistics reader 106, the example interrupt summer 108, the example interrupt weight mask 110, the example thread selector 112, the example thread pool 114, the example affinity mask loader 116, the example CPU selector 118, the example thread assigner 120, and/or, more generally, the example processor selector 100 of FIG. 1 is hereby expressly defined to include a tangible computer readable storage medium such as a memory, DVD, CD, Blu-ray, etc. storing the software and/or firmware. Further still, the processor selector 100 of FIG. 1 may include one or more elements, processes and/or devices in addition to, or instead of, those illustrated in FIG. 1, and/or may include more than one of any or all of the illustrated elements, processes and devices.

Figure 7:
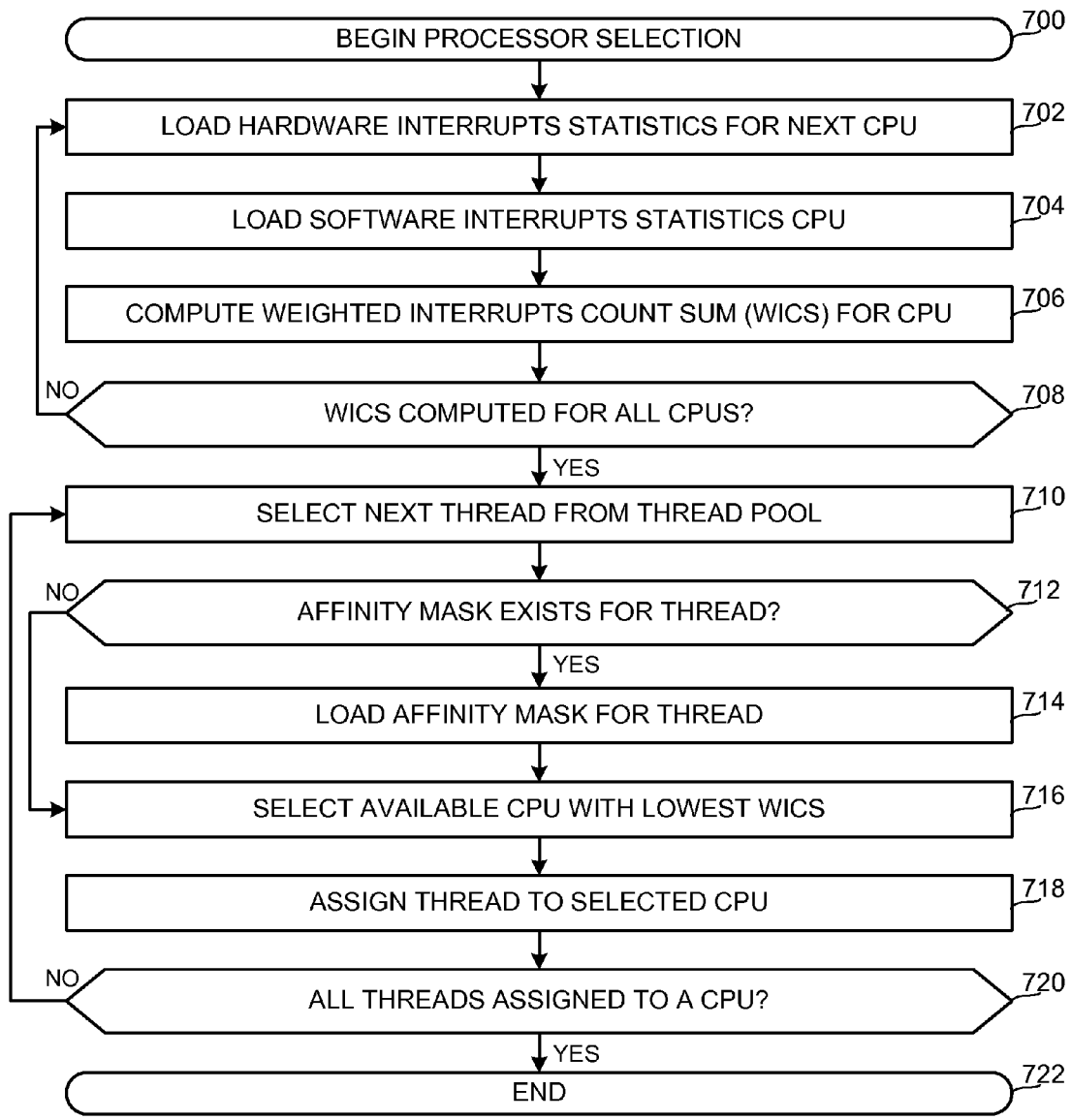
FIG. 7 is a flowchart representative of example machine readable instructions that may be executed to implement the example processor selector of FIG. 1

FIG. 7 is a flowchart representative of example machine readable instructions for implementing the example processor selector 100 of FIG. 1. In the example flowchart of FIG. 7, the machine readable instructions comprise program(s) for execution by a processor such as the processor 812 shown in the example computer 800 discussed below in connection with FIG. 8. The program(s) may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program(s) is described with reference to the flowcharts illustrated in FIG. 7, many other methods of implementing the example processor selector 100 of FIG. 1 may alternatively be used. For example, the order of execution of the blocks may be changed, and/or some of the blocks described may be changed, eliminated, or combined.

As mentioned above, the example processes of FIG. 7 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage device and/or disk and to exclude propagating signals. Additionally or alternatively, the example processes of FIG. 7 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage device and/or disk and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 7 begins with a call to the example processor selector 100 of FIG. 1 to assign one or more threads from one or more applications or processes to one or more example CPUs 103 of the example computer system 101 (block 700). The example hardware interrupt statistics reader 102 retrieves hardware interrupt statistics for the first CPU 103 of the example computer system 101 from the example CPU statistics database 104 (block 702). The example software interrupt statistics reader 106 then retrieves software interrupt statistics for the first CPU 103 of the example computer system 101 from the example CPU statistics database 104 (block 704).

After the hardware and software interrupt statistics have been retrieved, the example interrupt summer 108 then uses the loaded statistics as well as the example interrupt weight mask 110 to compute the weighted interrupt count sum for the first CPU 103 (block 706). The computed value of the weighted interrupt count sum for the first CPU 103 becomes the first element of the WICS vector. The example processor selector 100 then determines if a weighted interrupt count sum has been computed for all CPUs 103 of the example computer system 101 (block 708). If not, then control returns to block 702 and the interrupt statistics are loaded for the next CPU 103 of the example computer system 101 and the weighted interrupt count sum is computed for that CPU 103, which becomes the value of the next element of the WICS vector. This process is continued for each CPU 103 until the processor selector 100 determines that the weighted interrupt count sum has been computed for every CPU 103 of the example computer system 101. The computed interrupt count sum for each CPU 103 becomes the value of an element of the WICS vector and when the weighted interrupt count sum has been computed for each CPU 103, the WICS vector is complete.

Once the weighted interrupt count sum has been computed for each CPU 103 of the example computer system 101, control passes to block 710, wherein the example thread selector 112 selects a thread from the thread pool 114. Once a thread has been selected by the thread selector 112, the example processor selector 100 determines if an affinity mask exists for the selected thread (block 712). If an affinity mask exists for the selected thread, the example affinity mask loader 116 loads the affinity mask corresponding to the selected thread (block 714). Some threads have an associated affinity mask that assign the thread to a specific CPU and some threads have an affinity mask that assigns the thread to a ranger of CPUs, such as any core on a specific physical processor. Alternatively, some threads do not have a corresponding affinity mask. If the example processor selector 100 determines that the selected thread does not have an associated affinity mask, control passes from block 712 to block 716.

After either the example affinity mask loader 116 loads the affinity mask associated with the selected thread or the example processor selector 100 determines that no affinity mask associated with the selected thread exists, control arrives at block 716. The example CPU selector 118 then selects a CPU 103 to execute the selected thread (block 718). If an affinity mask was loaded by the example affinity mask loader 116, the example CPU selector 118 selects the CPU with the lowest corresponding value in the WICS vector from among the CPUs 103 allowable by the affinity mask associated with the thread. If there is no affinity mask associated with the thread, the example CPU selector 118 selects the CPU with the lowest corresponding value in the WICS vector from among all of the CPUs 103 of the example computer system 101. Once the example CPU selector 118 selects the CPU to assign a thread to, the example thread assigner 120 assigns the thread to the selected CPU 103 (block 718). The example thread assigner 120 assigns a thread through whatever means are required by the specific computer system and operating system being used.

Once the example thread assigner 120 assigns a thread to a CPU 103, the example processor selector 100 determines whether all threads of the example thread pool 114 have been assigned (block 720). If all the threads of the example thread pool 114 have not been assigned, then control returns to block 710 and another thread from the thread pool 114 is selected by the example thread selector 112. The example processor selector 100 then proceeds to blocks 712, 714 and 716 to assign the newly selected thread to a CPU 103. However, in block 714, once a thread has been assigned to a specific CPU 103, that CPU 103 is unavailable to execute additional threads. As such, additional threads must be assigned to a different CPU 103. Once every thread in the example thread pool 114 has been assigned to a CPU 103, the example of FIG. 7 ends (block 722).

Figure 8:
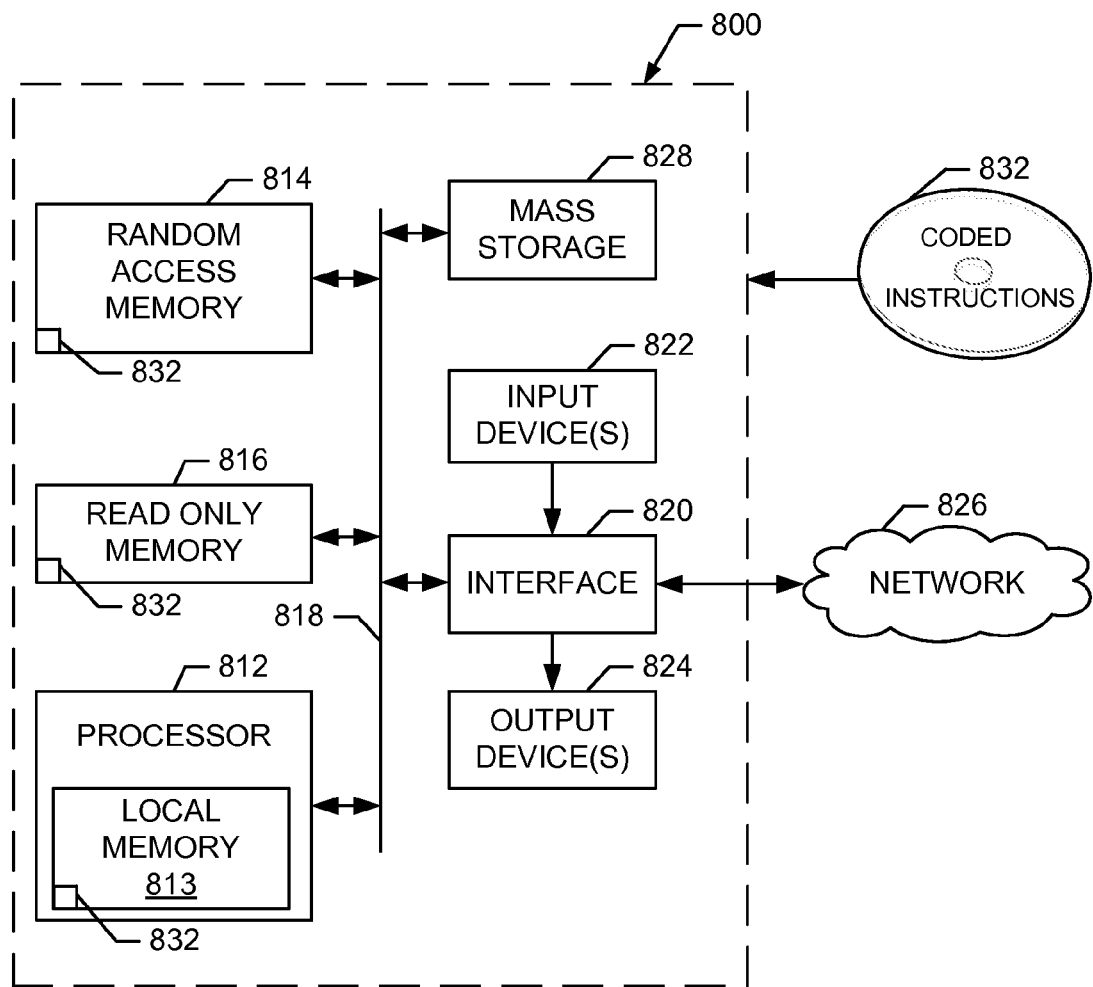
FIG. 8 is a schematic illustration of an example processing platform that may execute the example machine readable instructions of FIG. 7 to implement the example processor selector of FIG. 1.

FIG. 8 is a block diagram of a processor platform 800 capable of executing the instructions of FIG. 7 to implement the example processor selector 100 of FIG. 1. The processor platform 800 can be, for example, a server, a personal computer, an Internet appliance, a DVD player, a CD player, a Blu-ray player, a gaming console, a personal video recorder, a mobile device (e.g., a smart phone, a tablet, etc.), a printer, or any other type of computing device.

The processor platform 800 of the instant example includes a processor 812. As used herein, the term "processor" refers to a logic circuit capable of executing machine readable instructions. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

The coded instructions 832 of FIG. 12 may be stored in the mass storage device 828, in the volatile memory 814, in the non-volatile memory 816, and/or on a removable storage medium such as a CD or DVD.

Example methods to select a processor for a thread include, for each of a plurality of processors: retrieving a list of interrupt instances for a plurality of interrupt types; calculating an interrupt instance count value for each of the plurality of interrupt types; multiplying a corresponding weighting factor by the interrupt instance count value for each one of the plurality of interrupt types to generate a plurality of weighted interrupt values; calculating an overall weighted vector value based on the sum of the plurality of weighted interrupt values; and designating one of the plurality of processors as a selected processor based on the lowest overall weighted vector value.

In some example methods, the weighting factors are generated for the interrupt types based on a relative difference between a respective time required to handle an interrupt of the corresponding interrupt type.

In some example methods, the weighting factors are generated for the interrupt types based on a relative difference between resources required to handle an interrupt of the respective interrupt type.

In some example methods, the list of interrupt instances is retrieved from memory of a computer system that houses the plurality of processors.

In some example methods, the thread is loaded from a thread pool.

Some example methods further include loading an affinity mask associated with the thread, wherein the affinity mask specifies a first subset of the plurality of processors; and designating one of the processors as the selected processor based on the lowest overall weighted vector value among the first subset of processors.

Example tangible machine readable storage media have instructions that, when executed, cause a machine to at least, for each of a plurality of processors: retrieve a list of interrupt instances for a plurality of interrupt types; calculate an interrupt instance count value for each of the plurality of interrupt types; multiply a corresponding weighting factor by the interrupt instance count value for each one of the plurality of interrupt types to generate a plurality of weighted interrupt values; calculate an overall weighted vector value based on the sum of the plurality of weighted interrupt values; and designate one of the plurality of processors as a selected processor based on the lowest overall weighted vector value.

In some example storage media, the weighting factors are generated for the interrupt types based on a relative difference between a respective time required to handle an interrupt of the corresponding interrupt type.

In some example storage media, the weighting factors are generated for the interrupt types are based on a relative difference between respective resources required to handle an interrupt of the corresponding interrupt types.

In some example storage media, the instructions, when executed, cause the machine to retrieve the list of interrupt instances from memory of a computer system that houses the plurality of processors.

In some example storage media, the instructions, when executed, cause the machine to load the thread from a thread pool.

In some example storage media, the instructions cause the machine to load an affinity mask associated with the thread, wherein the affinity mask specifies a first subset of the plurality of processors; and designate one of the processors as the selected processor based on the lowest overall weighted vector value among the first subset of processors.

Example apparatus to assign a thread to a processor include processors; an interrupt statistics reader to retrieve respective interrupt instance count values for a plurality of interrupt types for corresponding ones of the processors; an interrupt weight mask to apply weighting factors to corresponding interrupt types; an interrupt summer to multiply the weighting factors by respective ones of the interrupt instance count values for corresponding ones of the interrupt types to generate a plurality of weighted interrupt values, the interrupt summer to calculate an overall weighted vector value for respective ones of the processors based on a sum of a corresponding set of the weighted interrupt values; and a selector to designate one of the processors to process the thread based on the lowest overall weighted vector value.

In some example apparatus, the weighting factor for the interrupt types are based on a relative difference between a respective time required to handle an interrupt of the corresponding interrupt type.

In some example apparatus, the weighting factor for the interrupt types are based on a relative difference between respective resources required to handle an interrupt of the corresponding interrupt type.

In some example apparatus, the interrupt statistics reader is to retrieve the interrupt instance count values for the processors from memory of a computer system that houses the processors.

Some example apparatus further include a thread selector to load the thread from a thread pool.

Some example apparatus further include an affinity mask loader to load an affinity mask associated with the thread, the affinity mask to specify a first subset of the processors, and the selector to designate one of the processors as the processor to process the thread based on the lowest overall weighted vector value among the first subset of processors.

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A method to select a processor for a thread, comprising:
    for each of a plurality of processors:
        calculating interrupt instance count values for respective ones of a plurality of interrupt types;
        calculating weighting factors for respective ones of the plurality of interrupt types, the weighting factors respectively based on a relative difference between resource consumption for respective ones of the plurality of interrupt types;
        multiplying a corresponding calculated weighting factor by the interrupt instance count value for respective ones of the plurality of interrupt types to generate a plurality of weighted interrupt values; and calculating an overall weighted vector value based on a sum of the plurality of weighted interrupt values; and designating one of the plurality of processors as a selected processor based on a lowest overall weighted vector value.

2. A method as defined in claim 1, wherein the resource consumption for respective ones of the plurality of interrupt types is measured in clock cycles required to handle a corresponding interrupt of respective ones of the plurality of interrupt types.

3. A method as defined in claim 1, wherein the interrupt types are retrieved from memory of a computer system that houses the plurality of processors.

4. A method as defined in claim 1, wherein the thread is loaded from a thread pool.

5. A method as defined in claim 1, further comprising loading an affinity mask associated with the thread, wherein the affinity mask specifies a first subset of the plurality of processors; and wherein designating one of the plurality of processors as the selected processor is based on the lowest overall weighted vector value among the first subset of the plurality of processors.

6. A tangible computer readable storage medium comprising instructions that, when executed, cause a machine to at least:

for each of a plurality of processors:
calculate an interrupt instance count value for respective ones of a plurality of interrupt types;
calculate a weighting factor for respective ones of the plurality of interrupt types, the weighting factor respectively based on a relative difference between resource consumption for respective ones of the plurality of interrupt types;
multiply a corresponding calculated weighting factor by the interrupt instance count value for respective ones of the plurality of interrupt types to generate a plurality of weighted interrupt values; and
calculate an overall weighted vector value based on a sum of the plurality of weighted interrupt values; and designate one of the plurality of processors as a selected processor based on a lowest overall weighted vector value.

7. A computer readable storage medium as defined in claim 6, wherein the resource consumption for corresponding ones of the plurality of interrupt types is measured in clock cycles required to handle a corresponding interrupt of the corresponding ones of the plurality of interrupt types.

8. A computer readable storage medium as defined in claim 6, wherein the instructions, when executed, cause the machine to retrieve the interrupt types from memory of a computer system that houses the plurality of processors.

9. A computer readable storage medium as defined in claim 6, wherein the instructions, when executed, cause the machine to load a thread from a thread pool.

10. A computer readable storage medium as defined in claim 9, wherein the instructions, when executed, cause the machine to:

load an affinity mask associated with the thread, the affinity mask specify a first subset of the plurality of processors; and wherein, to designate one of the plurality of processors as the selected processor, the instructions cause the machine to designate one of the first subset of the plurality of processors based on the lowest overall weighted vector value from among the first subset of the plurality of processors.

11. An apparatus to assign a thread to a processor comprising:

a plurality of processors;

an interrupt statistics reader to retrieve respective interrupt instance count values for a plurality of interrupt types for corresponding ones of the processors;

an interrupt summer to:
calculate a weighting factor for respective ones of the plurality of interrupt types, the weighting factors respectively based on a corresponding relative difference between resource consumption for a corresponding one of the plurality of interrupt types, and
multiply the weighting factors by respective ones of interrupt instance count values for corresponding ones of the interrupt types to generate a plurality of weighted interrupt values, the interrupt summer to calculate an overall weighted vector value for respective ones of the processors based on a sum of a corresponding set of the weighted interrupt values; and a selector to designate one of the processors having a lowest overall weighted vector value to process the thread.

12. An apparatus as defined in claim 11, wherein the respective resource consumption for respective ones of the plurality of interrupt types is measured in clock cycles required to handle an interrupt of the corresponding interrupt type.

13. An apparatus as defined in claim 11, wherein the interrupt statistics reader is to retrieve the interrupt instance count values for the processors from memory of a computer system that houses the plurality of processors.

14. An apparatus as defined in claim 11, further comprising a thread selector to load the thread from a thread pool.

15. An apparatus as defined in claim 11, further comprising an affinity mask loader to load an affinity mask associated with the thread, the affinity mask to specify a first subset of the plurality of processors, and the selector to designate the one of the plurality of processors as the processor to process the thread based on the lowest overall weighted vector value among the first subset of the plurality of processors.

* * * * *